United States Patent [19]
Blair

[11] 3,865,622
[45] Feb. 11, 1975

[54] CARBOXYLATED ACRYLONITRILE-BUTADIENE LATEX FABRIC COATING

[75] Inventor: Edgar A. Blair, Princeton, N.J.

[73] Assignee: Princeton Polymer Laboratories, Incorporated, Plainsboro, N.J.

[22] Filed: Dec. 26, 1972

[21] Appl. No.: 318,658

Related U.S. Application Data

[63] Continuation-in-part of Ser. No. 100,791, Dec. 22, 1970, abandoned.

[52] U.S. Cl. .......... 117/161 UT, 117/145, 260/29.7
[51] Int. Cl. .............................. B44d 1/09
[58] Field of Search ...... 117/145, 161 UD, 161 UT; 260/29.7 R, 29.7 D, 29.7 H, 29.7 T

[56] References Cited
UNITED STATES PATENTS

| | | | |
|---|---|---|---|
| 2,717,217 | 9/1955 | Sullivan | 117/161 UD |
| 2,868,754 | 1/1959 | Eilbeck | 260/29.7 H |
| 2,949,386 | 8/1960 | Cassel | 117/140 |
| 3,034,927 | 5/1962 | Fairclough | 117/161 UD |
| 3,445,272 | 5/1969 | Newton | 260/29.7 T |
| 3,515,573 | 6/1970 | Japs | 117/47 |

Primary Examiner—William E. Schulz
Attorney, Agent, or Firm—Cushman, Darby & Cushman

[57] ABSTRACT

A fabric coating comprising a carboxylated butadiene acrylonitrile polymer alone or in combination with a butadiene-acrylonitrile-styrene polymer, zinc oxide as a curing agent pigment and optionally a thickener is disclosed. A fabric thus coated has the appearance of leather, is waterproof, oil-proof and useful for wearing apparel.

5 Claims, No Drawings

CARBOXYLATED ACRYLONITRILE-BUTADIENE LATEX FABRIC COATING

CROSS REFERENCE TO RELATED APPLICATIONS

This is a continuation in-part of my earlier copending application Ser. No. 100,791 filed Dec. 22, 1970 and now abandoned.

BACKGROUND OF THE INVENTION

Fabrics made to resemble leather and coated with vinyl polymers or urethane polymers are already known and the fabrics so coated are resistant to both water and oil. Polyurethane coatings are preferred over the vinyl polymers as they are stronger and can be made in a thinner coating. However, they have the disadvantage in that they must be applied from a solution made with the respective urethane in one or more strong organic solvents. An example of such a strong solvent is N,N-dimethylformamide. The solvents are then removed from the coated fabric during the application process, the solvent removal frequently giving off harmful solvent vapors.

Polyurethanes which may be adapted for coating fabrics and the like are generally already well known, as indicated by the following U.S. Pat. Nos. 2,729,618; 2,871,218; 2,899,411; 2,901,467 and 3,000,757.

A particularly suitable commercial polyurethane is made from hydroxyl poly(tetramethylene adipate), butanediol-1,4 and diphenylmethane-P,P'-diisocyanate, manufactured by B. F. Goodrich and sold under the name Estane 5701. The properties of Estane 5701 are

| | |
|---|---|
| Specific Gravity | 1.19 |
| Shore Hardness | 88 A |
| Tensile strength | 8900 psi |
| 300% Modulus | 1830 psi |
| Ultimate Elongation | 590% |

According to a typical example prior art methods (see, for instance U.S. Pat. No. 3,515,573), Estane 5701 elastomer, as previously described, is dissolved in N,N-dimethylformamide (DMF) to make a 25 weight percent solution. A pigment is added, such as titanium dioxide, which is ground in the coating solutions, and is present in an amount of about 5 weight percent. The resulting solution is next coated onto a release paper at a knife gap of about 10 mils. The release paper thus coated is passed through an oven then dried leaving a polyurethane film 1.5 mils thick. Next the release paper carrying the film thus formed is carried to and passed under a second coating head where 5 mils of the same solution is applied. The desired fabric is then laminated to second layer of the coating and the entire composite is passed through an oven and dried. The fabric carrying the laminated film thereon is stripped from the release paper.

Vinyl plastisols have also been used to produce a coated fabric resembling leather; see U.S. Pat. No. 2,904,522. Some suitable plastisols are: Geon 121, a polyvinyl chloride having a limiting intrinsic viscosity $[\eta]_o$ of 1.2 and molecular weight of 89,000; Exon 654, a vinyl chloride-trichloroethylene copolymer (at least 95% vinyl chloride) $[\eta]_o$ of 1.2 and a mol. wt. of 89,000; Pliovic AO, a vinyl chloride-dialkyl maleate copolymer (at least 95% vinyl chloride); VYHH, a vinyl chloride-vinyl acetate copolymer (87% vinyl chloride) $[\eta]_o$ of 0.44 and mol. wt. of 20,000.

Other typical vinyl chloride polymers are: Geon 101 $[\eta]_o$ of 1.13 and mol. wt. 82,000; Geon 202 $[\eta]_o$ of 0.80 and mol. wt. of 49,000; Geon 205 $[\eta]_o$ of 0.51 and mol. wt. of 25,000; and Vinylite VYNV (copolymer of 95% vinyl chloride 5% vinyl acetate) $[\eta]_o$ of 1.87 and mol. wt. 174,000.

Several plasticizers can, of course, be employed to impart the desired hand to the coated fabric and they include dicapryl phthalate, butyl benzyl phthalate, cioctyl zelate, dioctyl adipate, trioctyl phosphate, alkyl aryl phosphates, e.g., tricresyl phosphate didecyl phosphalate, di-dodecyl phthalate, didecyl adipate, didecyl azelate, hydrogenated termphenyl, tetra hydro furfuryl esters (e.g., the adipate). low viscosity saturated and unsaturated polyesters (e.g., polyethylene glycol adipate and adipate-maleate), and mixtures of either two or more primary plasticizers or one or more primary plasticizers with one or more secondary plasticizers.

Fillers, such as talc, Fuller's earth and calcium carbonate may be added as needed. Other operative fillers are inorganic materials such as mica, clay, fibrous magnesium silicate, zeolites, glass fibers, carbon black, powdered charcoal, $SiO_2$ and diatomaceous earth, and organic materials, such as wood flour, lignin, lignin sulfonates, paper pulp, regenerated cellulose, finely ground straw, finely divided barks, such as Douglas fir bark of any fraction thereof, especially the cork fraction, shell, flours, e.g., walnut shell flour and other vegetable matter.

The vinyl plastisol composition generally contains a dispersion resin, about 100 parts; a primary plasticizer such as dioctyl phthalate; a secondary plasticizer such as odorless mineral spirits, about 20 parts; a pigment or pigments, about 20 parts; and stabilizers, about 5 parts. A suitable fabric is then coated with the above composition at a thickness of 10 mils and passed into an oven maintained at 400°F for 2 minutes. The coated fabric carrying the cured vinyl plastisol on one side thereof is removed from the oven and cooled to room temperature.

DETAILED DESCRIPTION OF THE INVENTION

It has now been found that carboxylated butadiene-acrylonitrile polymers alone, or in combination with one or more butadiene-acrylontrile-styrene polymers may be used in an aqueous solution together with a curing agent and optionally a thickener to produce a coated fabric resembling leather. The resulting product enjoys the physical and aesthetic properties as the polyurethane coatings previously used, is more economical than prior art coating materials, yet the application process does not require the use of strong organic solvents.

The use of such strong organic solvents as N,N-dimethylformamide (DMF) has several disadvantages, among them the problem of environmental pollution, not only for the immediate working area and the operators of the equipment, but also the surrounding atmosphere. This pollution is caused by the liberation of strong organic solvents into the air. Vapors of N,N-dimethylformamide are very harmful and may be absorbed through the skin. By using an aqueous solvent as in the present invention these problems are avoided.

According to the present invention an aqueous coating composition of the following general proportions is acceptable (unless otherwise indicated, all parts and percentages are by weight):

| | |
|---|---|
| Carboxylated butadiene-acrylonitrile latex solids (35%–45% solids) | 25 parts |
| Zinc oxide | 1 part |
| Pigment | 5 parts |
| Thickening agent | 2 parts |
| Water | 62 parts |

The coating composition is an aqueous suspension of the above general composition with from about 15 to about 50 weight percent of total solids, the solids comprising the latex, zinc, oxide, pigment and thickening agent.

As the latex ingredient of the composition of the present invention there can be used a suspension of at least one carboxylated butadiene - acrylonitrile polymer in water. The polymer may contain a quantity of antioxidant as included to account for normal manufacturing conditions. These polymers have also been described as carboxy-modified butadiene-acrylonitrile latices having a molecular weight in the range of about 1,000 to about 3,000, preferably in the range of about 1,200 to about 2,000. Commercially available carboxylated resins may vary in molecular weight by values of ± 150, 200 or even up to 300. The carboxyl content of suitable latices may vary within wide limits but will usually be of the order of about 0.50 to about 2.0 measured as meq/gram.

Generally the latex component of the composition will contain from 25–45 parts by weight of acrylonitrile, from 25–45 parts by weight of acrylic or methacrylic acid, preferably 1–10 parts, the balance being butadiene.

A typical commercial carboxylated butadiene-acrylonitrile latex is Hycar 1571 (sometimes characterized as a 1,3-butadiene:acrylonitrile:methacrylic acid copolymer, 53.5: 43.5:3; see U.S. Pat. No. 2,949,386) manufactured and sold by B. F. Goodrich Company, the specific properites of which are as follows:

| | |
|---|---|
| pH | 8.0–8.5 |
| Total solids (%) | 40–42 |
| Brookfield Viscosity (Centipoise) Spindle No. 2, 60 r.p.m. | 12 |
| Surface Tension (dynes/cm) | 33 |
| Specific Gravity: latex | 1.00 |
| Specific Gravity: solids | 1.01 |
| Residual Acrylonitrile (1%) | 0.15 |

Optionally, in conjunction with the carboxy-modified butadiene-acrylonitrile latex there may be used a butadieneacrylonitrile styrene terpolymer. An example of a typical commercial product of the above is Hycar 1577 manufactured and sold by B. F. Goodrich Company. The properties of Hycar 1577 are as follows:

| | |
|---|---|
| pH | 10.0–10.5 |
| Total Solids (%) | 39.0–42.0 |
| Brookfield Viscosity (Centipoise) No. 2 Spindle at 60 r.p.m. | 21 Cps. Min. |
| Surface Tension | 48 dynes/cm at 29°C |
| Specific Gravity of latex | 1.01 at 25°C |

When present, the terpolymer is in an amount of about 2 to 6 times that of the carboxy — modified latex and preferably of the order of about 6 parts of the terpolymer to 1 part of the carboxy - modified latex.

As a curing agent there may be used formaldehyde, a sulfur-based system, zinc oxide, a combination of zinc oxide and sulfur, MOCA (methylene-bis-o-chloroaniline) as well as other curing agents already known in the art.

Several pigments are optionally included in the formulation to give the desired color to the resulting product. Illustrative, but by no manner exhaustive examples are carbon black, titanium dioxide, chromium oxide and red iron oxide, as well as several organic pigments specifically intended for inclusion in latices. The amount and particular combination of pigments depends, of course, on the color of the desired product. Preferably the pigments are dispersed in an aqueous solution prior to mixing with the latex.

Viscosity of the aqueous suspension is adjusted, through the judicious application of selected thickening agents, to a value in the range of about 3,000 to about 12,000 cps, desirably in the range of 4,000–6,000 cps and preferably about 5,000 cps. The viscosity of the resin or latex is typically about 1,000 cps or even lower and the use of a thickening agent is needed to build up the aqueous suspension to a value of the order of about 5,000 cps.

Acrylonitrile and other nitrile-containing monomers are carboxylated in a known manner in the presence of water and either a base or an acid. An amide is first formed, then hydrolyzed to the acid according to the reaction:

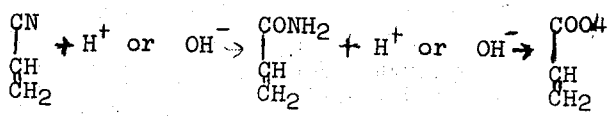

as reported in Roberts et al, Basic Principles or Organic Chemistry (1965), page 555.

As a thickening agent there may be used alginates; cellulose derivatives, such as carboxylated and regenerated cellulose such as sodium carboxymethyl cellulose; polyacrylates and the water soluble salt of polyacrylic acids, casein, either ammoniated, borated or caustic-cut, as well as other commercially available thickeners as Alcogum AN-10 and CMC-12H. Natural gums such as guar gum, karaya gum, gum tragacanth and alignates, as sodium and ammonium alginate and partially hydrolized protein such as fish glue may be used. Fish glue has been found to produce especially good results due to its good film properties and clarity, and for these reasons is the preferred thickening agent. Clays such as Bentonite also cause a thickening action.

The fabric to which the composition is applied is not critical and may be any convenient or commercially available substrate, examples of which are the woven and non-woven fabric substrates and can be made of fibers such as cotton, cellulose acetate, viscose rayon, cellulose acetate-propionate, wool, polyester, e.g., polyethylene terephthalate, polyamides, e.g. polyhexamethylene adipamide (nylon 66) or poly epsilon caprolactam (nylon 6), hemp, modacrylic, e.g. acrylonitrilevinyl chloride (85:15), polyacrylonitrile, polyvinyl alcohol, glass, polyestermaides, monoolefin polymers, e.g., polyproplene, polyurethane, rubber, etc.

The fabric substrates can be woven twills, drills and ducks; jersey, tricot and simpler knitted materials and felts; needle-punched batts, and batts impregnated with synthetic resins and rubbers. The fibers of the substrate can be natural of synthetic, crimped or straight, organic or inorganic, continuous filament or staple, or a paper-making length. Mixed fabrics can be used, e.g., a mixture of polyethylene terephthalate and cotton (such as 65:35, 50:50 or 35:65). According to the present invention 121 sateen is preferred.

An example of a preferred formulation according to the present invention is as follows. Unless otherwise indicated all parts and percentages herein are by weight.

FORMULATION I

| | |
|---|---|
| Hycar 1571 | 37 |
| Hycar 1577 | 220 |
| ZnO dispersion, 60% | 1.0 |
| Casein | 3.0 |
| Water | 25 |
| Pigment Dispersion, 50% | 5 |
| Total Solids | |

The composition of this formulation is applied either as a transfer coating or as a direct coating, as illustrated by the following examples. The thickness of each individual layer depends upon the character of the final product desired so that while coatings as thin as 2 mils may be used, a coating in the range of 5 to 15 mils is preferred although coating as great as 50 mils or even higher are possible.

Following the application of each coat the aqueous material is subjected to heat, as for example, in an oven maintained at about 170° to 400°F, thereby raising the temperature of the coated surface to about 150° to 350°F.

EXAMPLE 1

The composition of Formulation I was prepared and applied using a coating knife to a thickness of 10 mils. The coating film was then dried in an oven at 300°F and the dried film was again coated with the composition of Formulation I, this time to a thickness of 5 mils. The second coated layer is used as an adhesive to bond the coating layer to the fabric substrate. A 121 sateen fabric is then laminated to the "wet" layer and the entire composition dried at about 300°F after which it was removed from the release paper. The resulting product was similar to leather in both appearance and texture and was resistant to oil and water.

EXAMPLE 2

The composition of Formulation I was applied directly to 121 sateen fabric at a coating thickness of 4 mols. The layer was dried at 300°F and the coating step was repeated three times more under the same conditions to apply additional layers. The product emerging from the final drying area resembled leather in appearance and was water proof and oil-proof.

What is claimed is:

1. A fabric resembling leather coated on at least one surface thereof with an aqueous coating composition having a 15 to 50 weight percent of total solids, the solids comprising a mixture, in parts by weight, of carboxylated butadiene-acrylonitrile latex solids containing 25–45 parts of acrylonitrile, having a molecular weight in the range of about 1,200 to 2,000 and from 25–45 of acrylic or methacrylic acid, balance butadiene, about 37 parts, butadiene-acrylonitrile-styrene terpolymer solids, about 220 parts, curing agent, about 1 part, thickening agent, about 3 parts and pigment, about 5 parts.

2. A fabric as claimed in claim 1 where the curing agent is selected from the group consisting of formaldehyde and zinc oxide.

3. A fabric as claimed in claim 1 wherein the thickening agent is selected from the group consisting of sodium carboxymethyl cellulose, fish glue, polyacrylates and their salts, casein, guar gum, gum tragacanth, Bentonite and sodium alginate.

4. A fabric resembling leather having at least one surface thereof coated an aqueous coating composition of 15 to 50 weight percent total solids, the solids comprising a mixture, in parts by weight, of:

a. about 37 parts of carboxylated butadiene-acrylonitrile latex solids having the following properties:

| | |
|---|---|
| pH | 8.0–8.5 |
| Total solids | 40–42 |
| Brookfield viscosity (centipoise), spindle No. 2, 60 r.p.m. | 12 |
| Surface tension (dynes/cm) | 33 |
| Specific gravity: latex | 1.00 |
| Specific gravity: solids | 1.01 |
| Residual acrylonitrile (1%) | 0.15 | b. About 220 parts of butadiene-acrylonitrile-styrene terpolymer solids having the following physical properties:

| | |
|---|---|
| pH | 10.0–10.5 |
| Total solids (%) | 39.0–42.0 |
| Brookfield viscosity (centipoise) No. 2 spindle at 60 r.p.m. | 21 |
| Surface tension (dynes/cm) | 48 |

5. A fabric as claimed in claim 4 wherein the carboxylated butadiene-acrylonitrile latex solids have a molecular weight in the range of about 1,200 to about 2,000 and contain, in parts by weight:

25 – 45 parts acrylonitrile,
25 – 45 parts acrylic or methacrylic acid, and balance butadiene.

* * * * *